US010029685B1

(12) United States Patent
Hubbard et al.

(10) Patent No.: US 10,029,685 B1
(45) Date of Patent: Jul. 24, 2018

(54) VEHICLE SPEED LIMITER (71) Applicant: Speedgauge, Inc., San Francisco, CA (US)

(72) Inventors: Jonathan Hubbard, San Francisco, CA (US); Christopher A. Kantarjiev, Palo Alto, CA (US)

(73) Assignee: Speedgauge, Inc., San Francisco, CA (US)

( * ) Notice: Subject to any disclaimer, the term of this patent is extended or adjusted under 35 U.S.C. 154(b) by 9 days.

(21) Appl. No.: 15/442,438

(22) Filed: Feb. 24, 2017

(51) Int. Cl.
*B60W 30/14* (2006.01)
*G01S 19/13* (2010.01)

(52) U.S. Cl.
CPC .......... *B60W 30/146* (2013.01); *G01S 19/13* (2013.01); *B60W 2550/22* (2013.01); *B60W 2550/40* (2013.01); *B60W 2720/10* (2013.01); *B60W 2750/40* (2013.01)

(58) Field of Classification Search
CPC ............. B60W 30/146; B60W 30/143; B60W 2250/10; B60W 2250/402; G01S 13/86
USPC ................... 701/301, 93; 340/435–436, 903
See application file for complete search history.

(56) References Cited

U.S. PATENT DOCUMENTS

| 3,655,962 A * | 4/1972 | Koch ...................... B60T 7/128 246/182 C |
| 5,485,161 A | 1/1996 | Vaughn |
| 5,995,895 A | 11/1999 | Watt et al. |
| 6,246,948 B1 | 6/2001 | Thakker |
| 6,265,989 B1 | 7/2001 | Taylor |
| 7,272,469 B2 | 9/2007 | Kalau et al. |
| 7,587,260 B2 * | 9/2009 | Bruemmer ........... G05D 1/0088 318/567 |
| 7,739,036 B2 | 6/2010 | Grimm et al. |
| 7,859,392 B2 | 12/2010 | McClellan et al. |
| 7,957,882 B2 | 6/2011 | Morisset et al. |
| 8,188,887 B2 | 5/2012 | Catten et al. |
| 8,204,646 B2 | 6/2012 | Morisset et al. |
| 8,290,680 B2 | 10/2012 | Morisset et al. |
| 8,751,133 B2 | 6/2014 | Poulin |
| 8,890,717 B2 | 11/2014 | McClellan et al. |
| 9,409,554 B2 * | 8/2016 | Raste .................... B60T 8/1755 |
| 2008/0009965 A1 * | 1/2008 | Bruemmer ........... G05D 1/0088 700/245 |
| 2008/0154629 A1 | 6/2008 | Breed et al. |
| 2010/0332114 A1 | 12/2010 | Jung |

(Continued)

OTHER PUBLICATIONS

Map-Aided Dead-Reckoning Using Only Measurements of Speed Johan Wahlström; Isaac Skog; João G. P. Rodrigues; Peter Händel; Ana Aguiar IEEE Transactions on Intelligent Vehicles; year 2016, vol. 1, issue 3, pp. 244-253.*

(Continued)

*Primary Examiner* — Cuong H Nguyen
(74) *Attorney, Agent, or Firm* — Polsinelli LLP (57) ABSTRACT

The present disclosure is directed to apparatus, methods, and non-transitory storage medium for controlling the maximum speed of a vehicle as that vehicle travels along a route. Apparatus and methods consistent with the present disclosure may receive location information from an electronic device that is located at a vehicle and may provide information to the electronic device at that controls the maximum speed of the vehicle as speed limits change along the route.

20 Claims, 6 Drawing Sheets

(56) References Cited

U.S. PATENT DOCUMENTS

| | | | |
|---|---|---|---|
| 2014/0222272 A1* | 8/2014 | Raste | B60T 8/1755 |
| | | | 701/22 |
| 2015/0197247 A1* | 7/2015 | Ichinokawa | B60W 30/143 |
| | | | 701/93 |
| 2017/0248118 A1* | 8/2017 | Ivers | F03D 3/061 |

OTHER PUBLICATIONS

Modal Activity-Based Stochastic Model for Estimating Vehicle Trajectories from Sparse Mobile Sensor Data Peng Hao; Kanok Boriboonsomsin; Guoyuan Wu; Matthew J. Barth IEEE Transactions on Intelligent Transportation Systems; year 2017, vol. 18, issue 3; pp. 701-711.*

Analytical Tools for Loop Detectors and Traffic Monitoring Systems B. Coifman; H. Lee; 2007 IEEE Intelligent Transportation Systems Conference; Year: 2007; pp. 1086-1091.*

Supporting Drivers in Keeping Safe Speed in Adverse Weather Conditions by Mitigating the Risk Level Romain Gallen; Nicolas Hautière; Aurélien Cord; Sébastien Glaser IEEE Transactions on Intelligent Transportation Systems Year: 2013, vol. 14, Issue: 4; pp. 1558-1571.*

Schommer, Alana; "Breakthrough Truck Speed Limiter Adjusts to Local Posted Speed Limits", SafeSpeed, MAGTEC, Sep. 23, 2016.

* cited by examiner

VEHICLE SPEED LIMITER

BACKGROUND OF THE INVENTION

Field of the Invention

The present invention is generally directed to systems and methods for controlling a vehicle. More specifically, the present invention limits the maximum speed of a vehicle.

Description of the Related Art

Today various different types of speed limiting and monitoring apparatus are being produced. Some of these apparatus employ methods that use maps or grids combined with known speed limits when controlling or monitoring speeds at which vehicles travel.

In certain instances the speed of a vehicle controlled or monitored by an apparatus are implemented in vehicles that are driven by a person. In other instances, such as the instance of a driverless vehicle, the speed of a vehicle is controlled automatically by one or more computing devices.

Current methods used by apparatus for controlling a vehicle, however, have various limitations. One limitation of current apparatus and methods for controlling a vehicle is that they do not proactively limit the maximum speed of a vehicle by changing or beginning to change the maximum speed of a vehicle before a speed limit changes. Other limitations of current methods and apparatus for controlling a vehicle is that they do not include the ability to change maximum vehicle speeds based on a type of vehicle, current road conditions, anomalous road conditions, weather, or based on characteristics of particular drivers. Because of this, apparatus and methods that are currently deployed for controlling a vehicle may not provide an appropriate level of safety margin according to a set of conditions or characteristics that may affect a roadway, a vehicle, or a driver.

What are needed are new systems and methods for limiting the maximum speed vehicles based on various characteristics or conditions of a roadway, a vehicle, or a driver such that an appropriate level of safety margin can be maintained.

SUMMARY OF THE PRESENTLY CLAIMED INVENTION

The presently claimed invention relates to an apparatus, a method, and a non-transitory computer readable storage medium for controlling the maximum speed of a vehicle. A method of the presently claimed invention may receive information that identifies a first location along a route that is being traversed by a vehicle, where that first location may have been identified by a global positioning system at a vehicle and where the information that identifies the first location was transmitted from an electronic device at the vehicle. Next, the method of the presently claimed invention may identify a first maximum speed that corresponds to the route, a first speed limiting factor, and a characteristic of the vehicle. Next information may be transmitted to the electronic device at the vehicle that identifies a first maximum speed. After the information relating to the first maximum speed is transmitted, the electronic device at the vehicle may limit a maximum speed of the vehicle to the first maximum speed as the vehicle proceeds along the route. Then information relating to a second maximum speed that corresponds to second position along the route may be identified and be transmitted to the electronic device at the vehicle. The second maximum speed may also correspond to a second speed limiting factor, and the characteristic. The electronic device at the vehicle may then limit the maximum speed of the vehicle to the second maximum speed at the position that corresponds to the second position along the route.

When the presently claimed invention is implemented in a non-transitory computer readable storage medium, a processor executing instructions out of a memory may also receive information that identifies a first location along a route that is being traversed by a vehicle, where that first location may have been identified by a global positioning system at a vehicle and where the information that identifies the first location was transmitted from an electronic device at the vehicle. Next, the method of the presently claimed invention may identify a first maximum speed that corresponds to the route, a first speed limiting factor, and a characteristic of the vehicle. Next information may be transmitted to the electronic device at the vehicle that identifies a first maximum speed. After the information relating to the first maximum speed is transmitted, the electronic device at the vehicle may limit a maximum speed of the vehicle to the first maximum speed as the vehicle proceeds along the route. Then information relating to a second maximum speed that corresponds to second position along the route may be identified and be transmitted to the electronic device at the vehicle. The second maximum speed may also correspond to a second speed limiting factor, and the characteristic. The electronic device at the vehicle may then limit the maximum speed of the vehicle to the second maximum speed at the position that corresponds to the second position along the route.

An apparatus of the presently claimed invention may include a memory, a processor, and a network interface where the network interface may receive data from an electronic device at a vehicle over a network interface. Here again, the received information may include a first position of a vehicle traveling along a route. The first position of the vehicle may be identified by a GPS system at the vehicle. A first maximum speed of the vehicle may be limited to a first maximum speed that relates to a first speed limiting factor and to a characteristic. The processor executing instructions out of the memory may also identify a second speed limiting factor that corresponds to a second position along the route. Information for controlling the maximum speed may then be transmitted to an electronic device at the vehicle such that the maximum speed of the vehicle may be limited to a second maximum speed at the position that corresponds to the second position along the route.

DETAILED DESCRIPTION

The present disclosure is directed to systems and method for controlling the maximum speed of a vehicle as that vehicle travels along a route of travel. Typically a route of travel corresponds to one or more particular roadways along which a vehicle travels. The present disclosure is not limited to vehicles traveling along a roadway, however, as the maximum speed of a vehicle may be limited when that vehicle is moving in a parking lot or when traveling off of an official roadway.

Apparatus and methods consistent with the present disclosure may receive location information from an electronic device that is located at a vehicle and may provide information to the electronic device at that controls the maximum speed of the vehicle as speed limits change along the route.

Figure 1:
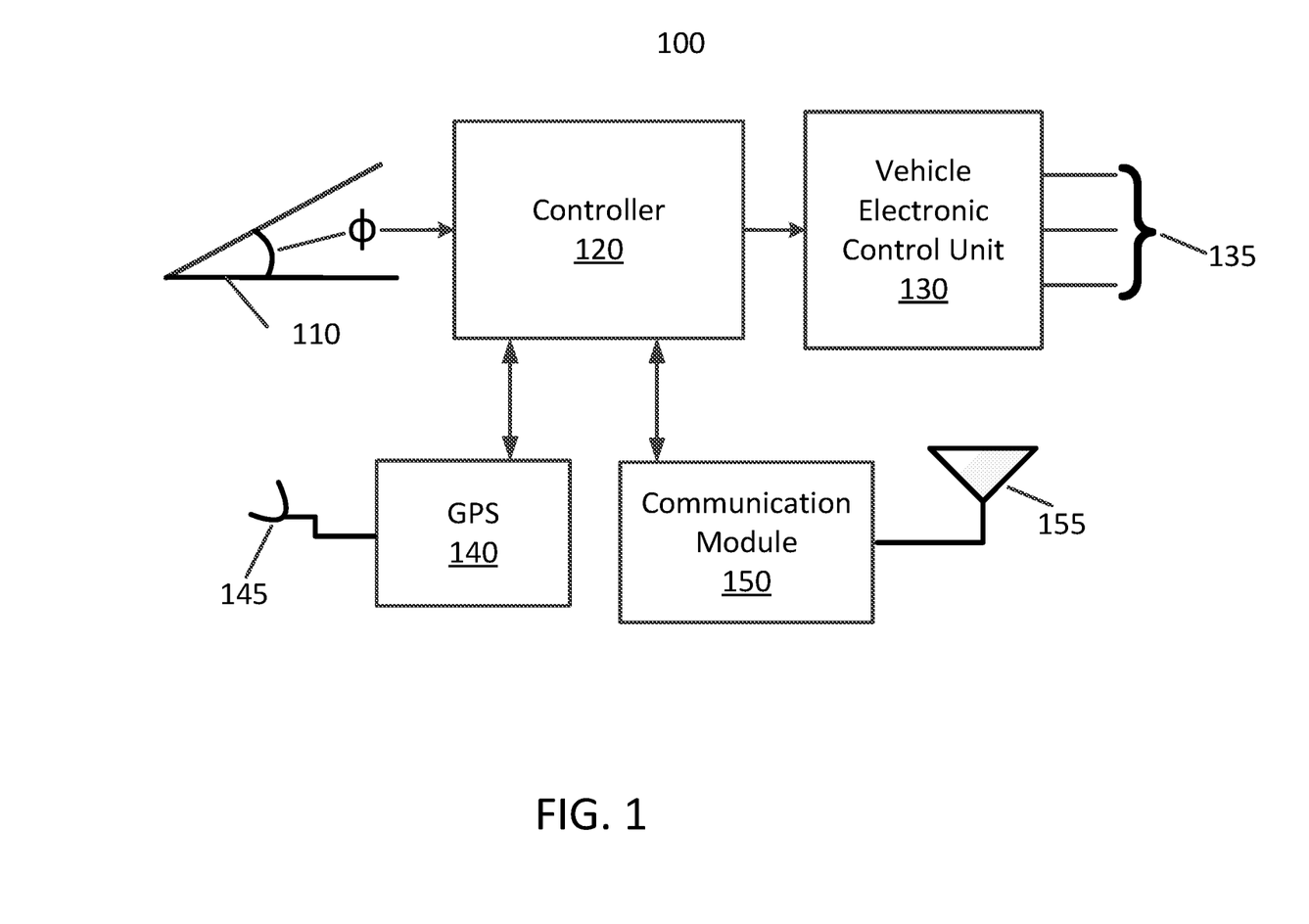
FIG. 1 illustrates an exemplary sub-system that may be implemented in a vehicle for controlling the speed of the vehicle.

FIG. 1 illustrates an exemplary sub-system that may be implemented in a vehicle for controlling the speed of the vehicle. The sub-system 100 of FIG. 1 includes a vehicle accelerator (i.e. a throttle or gas pedal) 110, a controller 120, a vehicle electronic control unit (ECU) 130, a global positioning system (GPS) module 140, and a communication module 150. When a driver depresses accelerator 110, a measure relating to how much the accelerator is depressed may be sensed by controller 120. The measure of accelerator depression may correspond to an angle like $\phi$ of FIG. 1. As such, $\phi$ may correspond to a measure of resistance when accelerator 110 is coupled to a rheostat (not depicted).

GPS module 140 may receive satellite information via antenna 145 and communicate that information to controller 120. In such an instance, GPS module 140 may provide information (such as longitude and latitude data) that identifies a current location of the vehicle to controller 120. Controller 120 may then transmit that location information via communication module 150 and communication antenna 155 to an external computing device. Communication module 150 may be implemented via any type of communication technology, including yet not limited to wireless cellular (2G, 3G, 4G, or other) communications, radio communications, or other communication technology standard in the art.

In certain instances, the information provided to an external computing device via communication module 150 and antenna 155 may be pushed (i.e. proactively sent to) to the external computing device or be pulled by the external computing device (i.e. sent in response to a ping or to a message that was sent from the external computing device). The information sent to the external computing device may also include a GPS location that corresponds to a speed limit or to a replacement maximum speed of particular locations.

Information may also be received from an external computing device via antenna 155 and communication module 150 that may identify a speed limit along a roadway or a replacement maximum speed. The information received from the external apparatus may be passed to controller 120 where controller 120 may compare current GPS location information with the received maximum speed information as controller 120 controls the maximum speed of the vehicle as the vehicle travels down a roadway.

When controller 120 identifies that a maximum speed of the vehicle should be changed, controller 120 may provide information to ECU 130 that limits the maximum speed of the vehicle, where ECU 130 controls the speed of the vehicle using vehicle control outputs 135. As such, vehicle control outputs 135 may be coupled to an engine, electric motor, or other apparatus that may limit the speed of the vehicle. In certain instances, controller 120 can limit the speed of the vehicle by directly providing speed control to an engine, an electric motor, or other apparatus. Controller 120 may, thus, bypass ECU 130 when limiting the speed of the vehicle.

While the maximum speed of a vehicle may be limited by controller 120 intercepting accelerator position and by providing substituted accelerator position data to ECU 130, the present disclosure is not limited to this technique. Alternatively, the speed of a vehicle may be controlled via other means, including, yet not limited to: applying controlled braking or dynamic braking (electronic vehicles), by controlling the pulse with of a pulse width modulation signal that provides power to electrical motors, by controlling fuel as it is delivered to an engine, or by other means.

Figure 2:
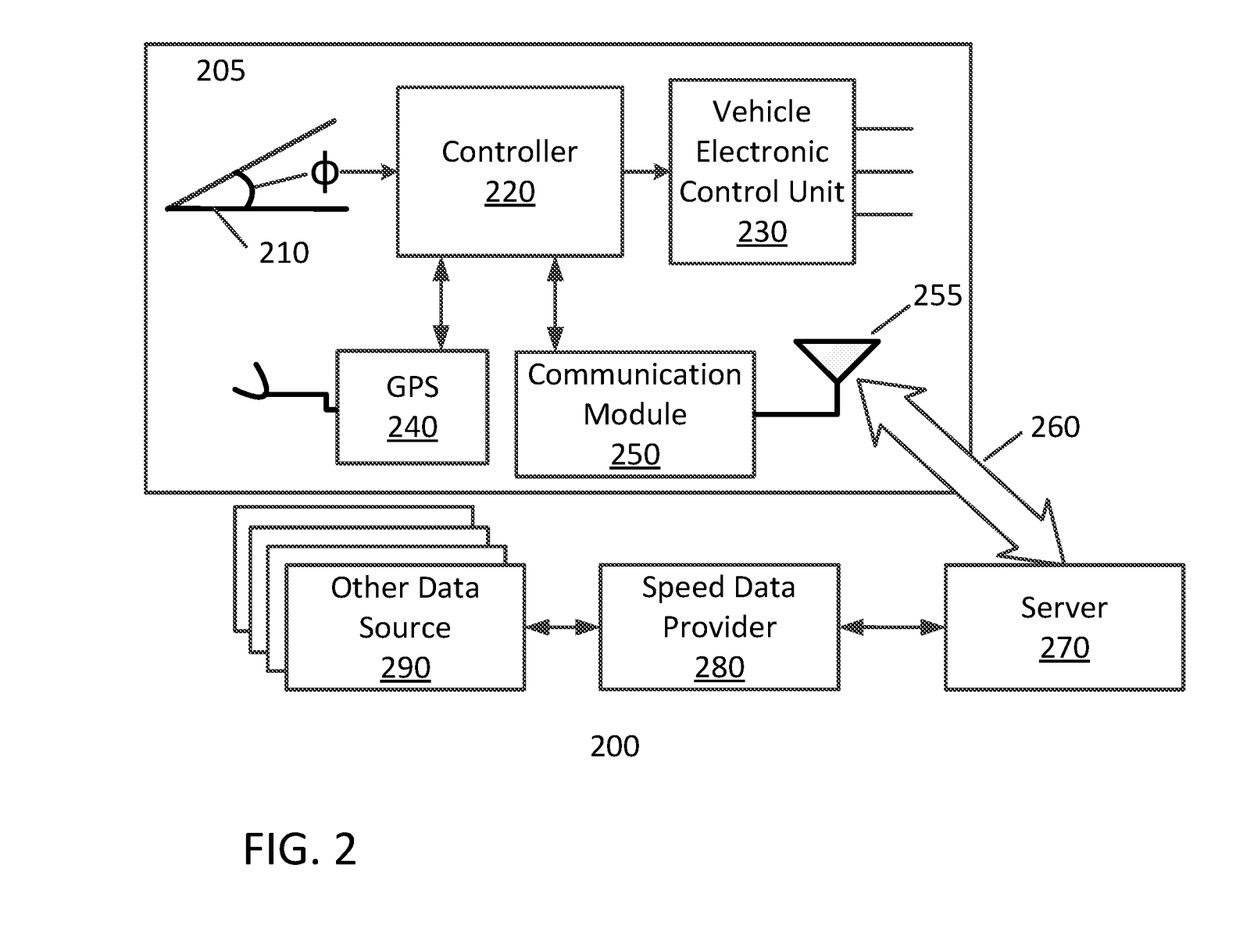
FIG. 2 illustrates an exemplary system consistent with the present disclosure that may be used for controlling a vehicle.

FIG. 2 illustrates an exemplary system consistent with the present disclosure that may be used for controlling a vehicle. The system 200 of FIG. 2 may include sub-system 205 that resides within a vehicle. Note that sub-system 205 of FIG. 2 includes accelerator 210. Here again the position of accelerator 210 may correspond to the angle 4) where a measure of resistance may be provided to controller 220. Controller 220 of FIG. 2 is located between accelerator 210 electronic control unit (ECU) 230, where controller 220 may intercept accelerator position information before it can reach ECU 230. Because of this, controller 220 may provide "controlled" accelerator position information to ECU 230 when limiting the maximum speed of a vehicle.

Controller 220 may receive location information from GPS unit 240 and may provide that location information to an external computing device via communication module 250 and communication antenna 255. Note that FIG. 2 also includes wireless signal 260 that communicates information to external server 270. External server 270 may periodically ping a vehicle control sub-system of a vehicle for location information. In such instances, server 270 may send a communication that requests (i.e. that "pings") that vehicle control sub-system 205 send location information to the server 270. Server 270 may also send some or all of this information received from vehicle control sub-system 205 to speed data provider 280 for analysis. Note that server 270 may ping vehicle control subsystem 205 periodically (i.e. every 10 seconds, for example).

Server 270 may receive GPS data from sub-system 205 via wireless signal 260, and server 270 may communicate this GPS data to speed data provider 280. Speed data provider 280 may also receive data from one or more other sources 290. In certain instances, speed data provider 280 may track a route along which a vehicle is traveling. Speed data provider 280 may then provide information to server 270 that relates to the route along which the vehicle is traveling. The information provided by the speed data provider 280 may include information that identifies: a speed limit at a location, a maximum speed setting that corresponds to the location, or may include other information that is pertinent to limiting the maximum speed of the vehicle as it travels along the route. Server 270 may also forward the information provided by speed data provider 280 to sub-system 205 such that controller 220 may control the maximum speed of the vehicle according to the information provided by speed data provider 280.

Speed data provider 280 may retrieve or be provided data from other data sources 290 when preparing information to send to server 270. Sources of this other data include, yet are not limited to electronic devices that are directly connected to roadway infrastructure (such as signal lights) and services that post roadway information. These other data sources 290 of FIG. 2 may be a system that collects information related to a roadway or be a system that provides weather information regarding an area around the roadway. As such, data collected from other sources 290 may include information relating to an accident, information related to road hazards, or information related to weather conditions. In certain instances, server 270 or speed data provider 280 may provide information relating to real-time information that limits the speed of the vehicle along a roadway based on current road conditions. For example, when server 270 or speed data provider 280 identifies that it is raining along a certain section of roadway where a vehicle is traveling, information may be sent to communication module 250 such that controller 220 may limit the speed of the vehicle to 45 MPH, for example. In yet other instances, the speed of a vehicle may be limited to speeds stored in memory at sub-system 205.

In certain instances, the functions of server 270 and speed data provider 280 discussed herein may be implemented by different computing devices that communicate with each other over a data communication interface. In yet other instances, the functions of server 270 and speed data provider 280 may be implemented in a single computing system. As such, server 270 and speed data provider 280 may reside in different physical locations or may be co-located at a single physical location. In certain instances, speed data provider 280 and server 270 may communicate with each other over the internet.

While data may be transmitted from a vehicle control sub-system periodically, data may also be transmitted from a vehicle control sub-system whenever the vehicle control sub-system has detected a change in the route being driven. A change in route may, for example, be identified when a vehicle turns more than a threshold number of degrees off a particular route. Alternatively or additionally, a change of route may be identified when a vehicle turns onto another roadway. In certain instances data may be transmitted from a vehicle when an anomalous condition has been observed. Alternatively or additionally data may be transmitted from a vehicle when an event is detected. For example, when a vehicle stops moving or when the vehicle is involved in an accident a vehicle control sub-system may send a message to an external electronic device.

Since transmissions to server 270 may not (always) be periodic, server 270 or speed data provider 280 may also use timing information when the speed of a vehicle is controlled. In one instance, controller 220 may transmit a relative or absolute time via communication module 250, antenna 255, and signal 260 when location information is transmitted from sub-system 205 to server 270, and server 270 may also transmit this time based information when vehicle location information is transmitted to speed data provider 280. In such instances, speed data provider 280 could calculate or identify measures of vehicle speed by evaluating relative changes in vehicle location and changes in time between different relative locations.

Figure 3:
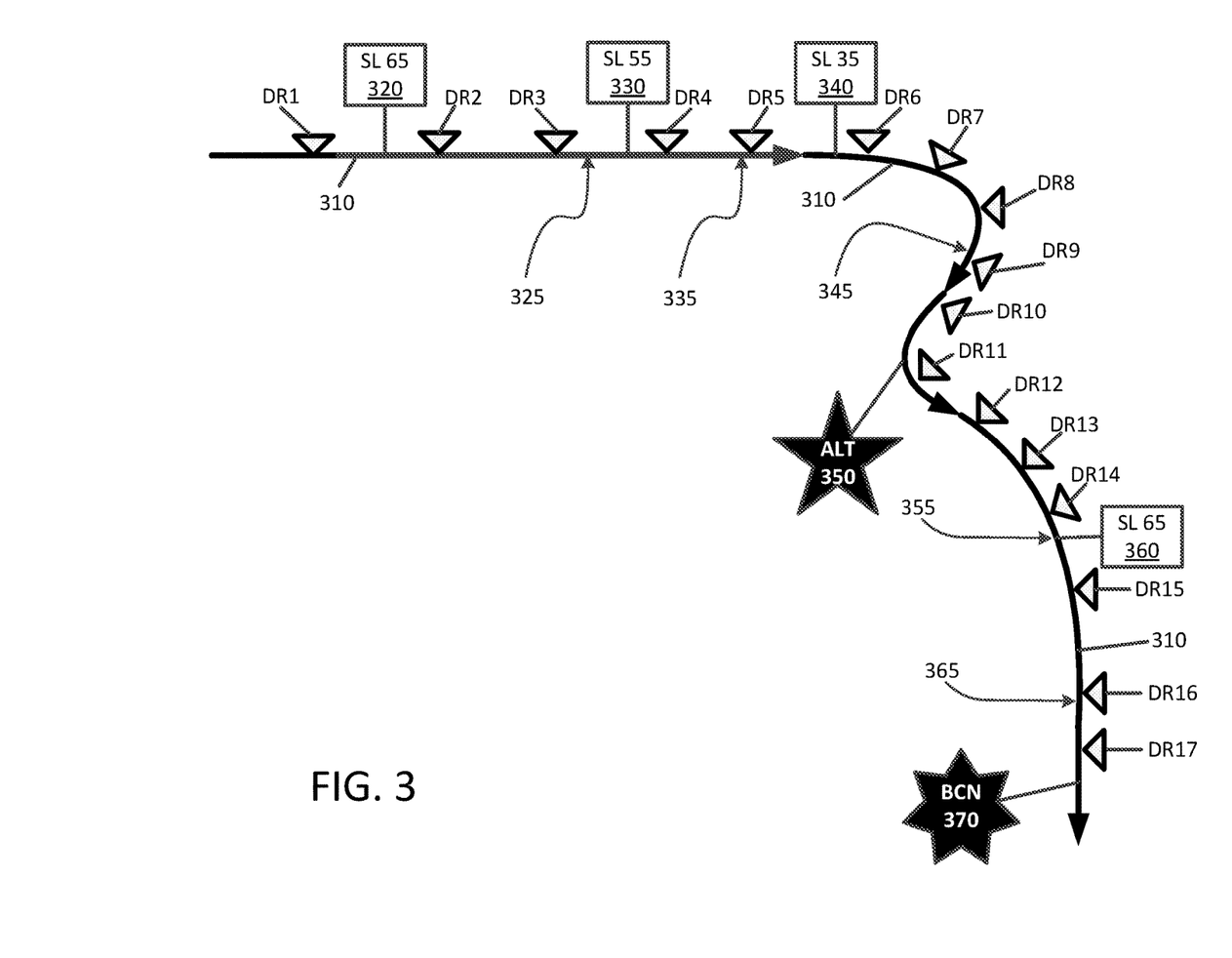
FIG. 3 illustrates an exemplary route along which a vehicle is traveling.

FIG. 3 illustrates an exemplary route along which a vehicle is traveling. Route 310 of FIG. 3 may be a particular road, such as U.S. Interstate Highway 50. Note that FIG. 3 includes numerous points from which data may be received from a vehicle control sub-system. The data received from these numerous data points are illustrated as data received point 1 (DR1) through DR17 along route 310. Note that the arrows in route 310 indicate a direction of travel of a vehicle that is being tracked and controlled by systems and methods consistent with the present disclosure.

FIG. 3 also includes several different speed limit indicators SL 65 320, SL 55 330, SL 35 340, and SL 65 360. Each of these speed limit indicators may identify a speed limit associated with route 310 as those speed limits change along route 310 from DR1 through DR17. In certain instances, a server may receive information, such as GPS location information, from a vehicle according to a sample rate or after an interval of time. For example, a server may receive information from the vehicle every 10 seconds. In such an instance, each of the respective locations associated with DR1, DR2, DR3, . . . , DR17 may be acquired as a vehicle moves along route 310. Since the distance along route 310 is linear and since a sample rate of vehicle in FIG. 3 is periodic, how close a first relative data received point is from a second relative data received point corresponds to a speed that the vehicle was traveling between the first relative data received point and the second relative data received point of FIG. 3. As such, a distance between each respective data received points DR1 through DR17 is indicative of changes in vehicle speed as the vehicle drives along route 310. In such an instance, larger distances between respective data received points are associated with higher vehicle speeds and smaller distances between relative data received points are associated with slower vehicle speeds. Note that distances between each respective data received point between data received points DR6 and DR14 are closer together than distances between each respective data received point between data received points DR1 and DR6. As such, the vehicle traveling along route 310 of FIG. 3 was moving at slower speeds between data received points DR6 and DR14 as compared to speeds that the vehicle was moving between data received points DR1 and DR6.

As noted above, while data may be transmitted from a vehicle control sub-system periodically, data may also be transmitted from a vehicle control sub-system whenever the vehicle control sub-system has detected a change in the route being driven. In certain instances data may be transmitted from a vehicle when an anomalous condition has been observed. Alternatively or additionally data may be transmitted from a vehicle when an event is detected. For example, when a vehicle stops moving or when the vehicle is involved in an accident a vehicle control sub-system may send a message to an external electronic device.

FIG. 3 also includes command points 325, 335, 345, 355, and 365. These command points may correspond to locations where a vehicle was located at when it received updated information from a server, such as server 270 of FIG. 3. Alternatively, these command points may correspond to GPS coordinates identified in transmissions that were received before the vehicle has reached the GPS coordinates associated with command points 325, 335, 345, 355, and 365. In either case, a controller of a vehicle control sub-system after receiving information regarding a command point, may cause the maximum speed associated with a vehicle to be changed such that the vehicles maximum speed does not exceed a posted speed limit at all or by more than a threshold amount.

In certain instances, the precise physical location of command points 325, 335, 345, 355, and 365 may vary based on one or more characteristics that may be associated with a vehicle, with facts relating to a roadway/direction of travel, with driver facts (such as an experience level), with a time of day/night, or with current weather conditions. Exemplary characteristics that may be associated with a vehicle include a vehicle weight or vehicle type. Facts relating to the roadway may identify the location of an accident, may indicate a road hazard, or may identify that road congestion will likely increase in an area near a ball park when a ball game is ending. Weather conditions that may affect the controlled speed of a vehicle include indications of poor weather (i.e. foggy, rainy, snowy, sunny, or windy conditions) or may relate to the fact that the Sun is likely shining in the driver's eyes at a particular location at a particular time.

Note also that FIG. 3 includes a star ALT 350 that identifies a location that may be associated with something that may affect a roadway. Information relating to location ALT 350 may have been reported to a vehicle control sub-system of a vehicle indirectly. For example, an external computing device could have provided information regarding the location of ALT 350 to the vehicle control sub-system 205 of FIG. 2 based on information that the external computing device received from other information sources.

FIG. 3 also includes beacon BCN 370 that may transmit information to data collection systems. Alternatively beacon BCN 370 may transmit signals directly to vehicle control sub-systems consistent with the present disclosure. In an instance where information from beacon BCN 370 is received by a data collection system, that information may be provided to the vehicle control sub-systems of various vehicles indirectly. For example, a signal from beacon BCN 370 may be received by ground based infrastructure receiving devices, where information relating to BCN 370 may be forwarded to a speed data provider that in turn forwards that information to a server that wirelessly transmits control information to one or more vehicle control sub-systems consistent with the present disclosure.

In instances where a beacon transmits signals directly to vehicle control sub-systems, such vehicle control sub-systems may include radio receivers that are designed to receive signals directly from transmitters that are resident along the side of a roadway. In certain instances, beacon BCN 370 may be located within a service vehicle or with an emergency vehicle. Examples of service and emergency vehicles include maintenance vehicles, police cars, ambulances, and fire engines.

Vehicles that include beacons, such as BCN 370, may only broadcast a beacon signal when a service or emergency vehicle stops or slows along a roadway. For example, a beacon may begin transmitting when a service vehicle slows down below a threshold speed when traveling along a roadway.

Alternatively, a speed data provider and a server (such as the speed data provider 280 and server 270 of FIG. 2) may track both service vehicles and other vehicles, where information collected by the speed data provider or server may be used to limit the speed of these other vehicles as they approach a location where a service vehicle has stopped.

As such, a beacon may be coupled to speed controlled vehicles either directly via a transmission from the beacon that is received by a speed control sub-assembly or be coupled indirectly via one or more other electronic devices.

Figure 4:
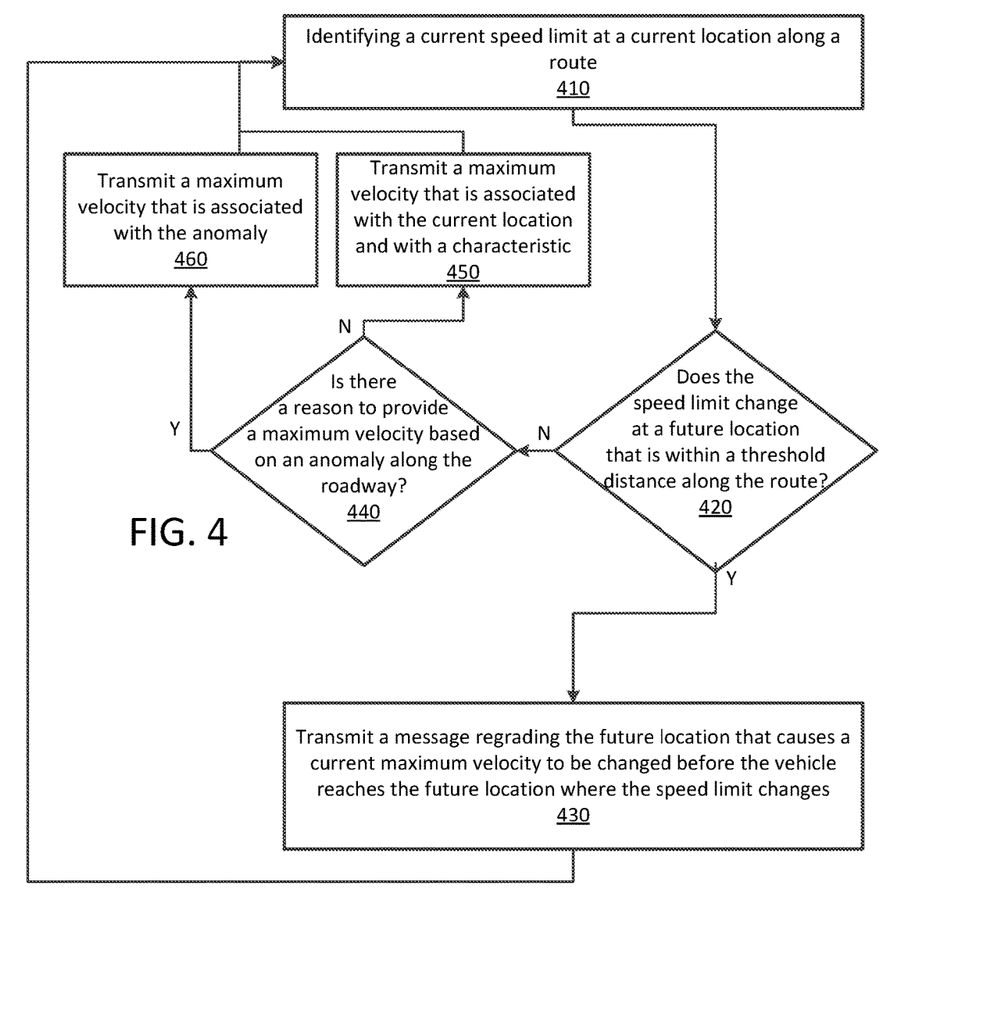
FIG. 4 illustrates an exemplary method consistent with the present disclosure.

FIG. 4 illustrates an exemplary method consistent with the present disclosure. FIG. 4 begins with a first step 410 where a current speed limit that is associated with a current location and a route is identified. This first speed limit, for example, may be associated with a roadway, such as route 310 of FIG. 3. After step 410, step 420 of FIG. 4 identifies whether the speed limit changes at a future location along a route that is within a threshold distance from the vehicle.

When the speed limit does change within a threshold distance from the vehicle, the flow chart of FIG. 4 moves from step 420 to step 430 where a message may be transmitted to the vehicle. In certain instances, information in the message sent to the vehicle may cause a maximum speed associated with the vehicle to be changed before the vehicle reaches the future location where the speed limit actually does change. In such an instance, a maximum speed setting of the vehicle may be changed hundreds or thousands of feet before a projected future location where the speed limit changes. Since a heavy vehicle, like a semi-truck has more inertia than a small vehicle, such as a compact car, it may take longer for the heavy vehicle to slow down as compared to the smaller vehicle. In such instances, information included in a message sent to a vehicle control device may be tailored to a type of vehicle, where maximum speeds of different vehicle types are associated with different speed offsets. For example, the information sent to a semi-truck may cause the semi-truck to begin slowing from 65 miles per hour (MPH) to 45 MPH some 3000 feet (i.e. a 3000 foot offset) before the semi-truck reaches the point where the speed limit changes from 65 MPH to 45 MPH. In the instance where the vehicle is a compact car, the information sent to the vehicle may cause the compact car to begin slowing from 65 MPH to 45 MPH 2000 feet (i.e. a 2000 foot offset) before the compact car reaches the point where the speed limit changes from 65 MPH to 45 MPH. As such, the information sent to a particular vehicle may correspond to the type, weight, or size of the particular vehicle being controlled.

In certain instances, the information sent to the vehicle in step 430 may include a GPS location that is some distance before the actual location where the speed limit changes. This information sent to the vehicle may include a new maximum speed and may include the actual GPS location where the speed limit actually changes. Alternatively, the transmission may include information relating to the speed limit change where information in that transmission causes the vehicle to slow down immediately upon receiving a new maximum speed, this may occur at a distance that is well before the location where the speed limit actually changes. Because of this, embodiments of the present disclosure may control the maximum speed of a vehicle such that the vehicle never exceeds a speed limit associated with a roadway.

The speed of a vehicle may be controlled by systems and methods of the present disclosure according to one or more profiles that may be associated with a vehicle or a driver. For example, the 3000 foot offset discussed above relating to a semi-truck reducing speed from 65 MPH to 45 MPH may correspond to a speed or velocity change profile. Such a profile may correspond to different distances for different amounts of speed or velocity changes. For example, the semi-truck may be commanded to change a maximum speed 2000 feet before a speed limit changes from 65 MPH to 55 MPH and that same semi-truck may be commanded to change a maximum speed 1000 feet before a speed limit changes from 40 MPH to 35 MPH. Furthermore, velocity or speed profiles associated with the present disclosure may correspond to allowing the speed or velocity of a vehicle to reduce according to a target rate of speed or velocity decrease, such that the vehicle slows down gradually.

The information transmitted to the vehicle in step 420 may also include a maximum speed that is associated with particular weather conditions or times of day/night. For example, when it is raining, instead of transmitting information relating to actual speed limits of a roadway, the maximum speeds transmitted to the vehicle may be reduced. For example, when a speed limit of a particular portion of roadway is 65 MPH, a maximum speed of 45 MPH may be sent to a vehicle instead of a maximum speed of 65 MPH because it is raining.

Weather conditions may also be used to change speed offset distances. For example, instead of instructing a control system to change a maximum speed setting 3000 feet before a speed limit change, the maximum speed setting may be changed 3500 feet before the speed limit change when it is raining. In another example, a certain location may be associated with a maximum speed of 65 MPH during the day and that same location may be associated with a maximum speed of 60 MPH during the night. After step 430, program flow moves back to step 410 of FIG. 4 where the current speed limit of a current location along the route is identified again.

When determination step 420 identifies that the speed limit does not change at a projected future location within a threshold distance along the route, program flow moves from step 420 to step 440. Step 440 then identifies if there is a reason to provide a maximum speed to a vehicle based on an anomaly along the roadway, when yes, program flow moves to step 460 where a new maximum speed is transmitted to the vehicle based on the anomaly. Here again the information transmitted to the vehicle may cause the vehicle to slow down before an actual location where the anomaly is located.

In yet other instances, a vehicle speed limiting system consistent with the present disclosure may be aware of an intended route and speed limits or speed limiting road conditions associated with that route before a vehicle has traveled along that route. In such instances information about a route may be sent for storage in a memory at a vehicle speed limiting system. This information stored in the memory may include route geometric information and may include numerous points where a maximum speed setting of the vehicle may change. As the vehicle begins driving along that route, a computer that controls the vehicles speed may compare position data (such as GPS data) with the speed related data stored in the memory when that computer controls or limits the speed of the vehicle. In such instances, the speed of a vehicle may be limited along an entire route based on information previously stored in the memory. As such, vehicle control systems consistent with the present disclosure may be pre-initialized with route information such that the vehicle control system may limit the velocity of the vehicle even without receiving transmissions from external electronic devices as the vehicle travels along that route.

In certain other instances, the speed of a vehicle may be limited when the vehicle travels along a route that the vehicle speed limiting system has not been pre-initialized to traverse. In these instances, the vehicle control system may be configured to receive information from an external computing device less frequently. For example, rather than continuously receiving information from an external computer every 30 seconds, route speed information may be received once every several minutes or when the vehicle reaches certain geo-locations. When a vehicle control system receives route information infrequently, that control system may receive information relating to a series of points along a route. For example, a server that sends speed limiting information to a vehicle control system may be configured to send information to the vehicle control system in bursts. These bursts of information may include multiple geo-locations where the maximum speed of the vehicle changes along the route. Here again the vehicle control system may limit the speed of the vehicle based on location information and based on route information stored in memory at the vehicle control system.

As the vehicle traverses the route, that vehicle control system may be provided with information regarding a plurality of future geo-locations where speed limits change in a just in time fashion. In such instances, the vehicle control system may be provided with geometric information relating to points that the vehicle has not yet reached. When performing such functions, the vehicle control system may send transmissions to a server that informs the server to send an additional burst of information to the vehicle control system. Alternatively or additionally bursts of information may be sent to the vehicle control system by the server when according to a protocol at the server. In such instances, the bursts of information sent from the server may include route geometric information that spans several minutes of vehicle travel time. The information sent to the vehicle control system by the server may be based on the current position of the vehicle or be based on a current or projected speed of the vehicle as the vehicle travels along a route or heading.

In instances where communications between a server and a vehicle control system are limited, the server and the vehicle control system may communicate when a communication protocol is configured. In such instances, how frequently the server communicates with the vehicle control system may be limited based on actions performed by the server, be based on actions performed by the vehicle control system, or be limited based on an agreement between the server and the vehicle control system. When the server wishes to limit communication frequencies with a vehicle control system, the server may simply set a communication protocol at the vehicle control system via a transmission. When a vehicle control system wishes to limit communication frequencies with the server, the vehicle control system may request that the server use a communication protocol that limits how frequently communications are performed based on protocols supported by both the server and the vehicle control system. In instances where the server and the vehicle control system communicate when limiting communication frequencies, how frequently communications are performed may be set based on limitations of the vehicle control system that are provided to the server, or be based on wireless communication capabilities associated with certain particular sets of geo-locations along a route. As such, communication protocols may be used to change how frequently communications are sent between a server and a vehicle control system dynamically as a vehicle travels along a route. Anomalies that may cause a new maximum speed to be transmitted to the vehicle include, yet are not limited to: the location of a service or emergency vehicle, the location of a beacon, the location of a reported incident, or a "location of observations" made by systems and methods of the present disclosure. An example of a "location of observations" made by systems and methods of the present disclosure include, identifying that the speeds associated with various other vehicles traveling along the route have slowed to a speed that is less than the speed limit at a particular location. In such an instance, the particular location may be associated with an unknown or unreported hazard. For example, an obstruction (such as a rock, a ladder, or a piece of furniture) may have fallen or been dropped on the roadway that has caused these other vehicles to slow. Since systems and methods associated with the present disclosure may include various different vehicles where each vehicle includes a vehicle control sub-system, external computing devices consistent with the present disclosure may send information to vehicles that have not yet reached a location that is associated with anomalistic vehicle speed changes.

Vehicle control systems consistent with the present disclosure may also include an interface where a driver may initiate a transmission that informs external computing devices that an obstacle is in the roadway at a particular location. For example, after a driver has encountered an obstacle in the roadway, the driver could press a button or simply speak a word (i.e. "obstacle") to their vehicle control system, and the vehicle control system could send a message relating to the obstacle to an external computing system. After the external computing system receives the message regarding that obstacle, it could send messages regarding that obstacle to other vehicles traveling along that route before those other vehicles reached the obstacle. Another type of anomaly associated with a vehicle may include a driver pressing a button or by speaking a word that overrides a current maximum speed setting at a vehicle control sub-system. In such instances spoken words may be interpreted by a voice recognition system at the vehicle or at an external electronic device.

When determination step 440 identifies that there is no reason to provide the vehicle a maximum speed based on an anomaly, program flow moves from step 440 to step 450 where a maximum speed that is associated with the current location and with a characteristic may be sent to the vehicle in step 450 of FIG. 4. Here again the maximum speed sent to the vehicle may be simply the speed limit associated with the location.

Alternatively, the maximum speed provided to the vehicle may be offset from an actual speed limit by a certain margin or percentage of the speed limit. In such instances, the maximum speed provided to a vehicle may be slightly above or below the actual speed limit. For example when the speed limit is really 65 MPH, a maximum speed sent to the vehicle may be 69 MPH. In yet another example, all compatible vehicles traveling along a particular route may be provided a maximum speed of 15 MPH when a particular route is associated with snowy or icy conditions.

A characteristic associated with a vehicle and a maximum speed may relate to an experience level of a driver. For example, when a novice driver drives a heavy vehicle, that vehicles speed may be limited to 25 MPH even when a speed limit associated with a roadway where the vehicle is driving is 40 MPH. In such instances, different maximum speeds can be provided to the same vehicle based on an experience level of low, medium, and high, where each experience level is associated with different maximum speeds based on one or more sets of rules.

After step 450 or step 460, FIG. 4 proceeds back to step 410 where the current speed of the current location of the route is identified again.

Figure 5:
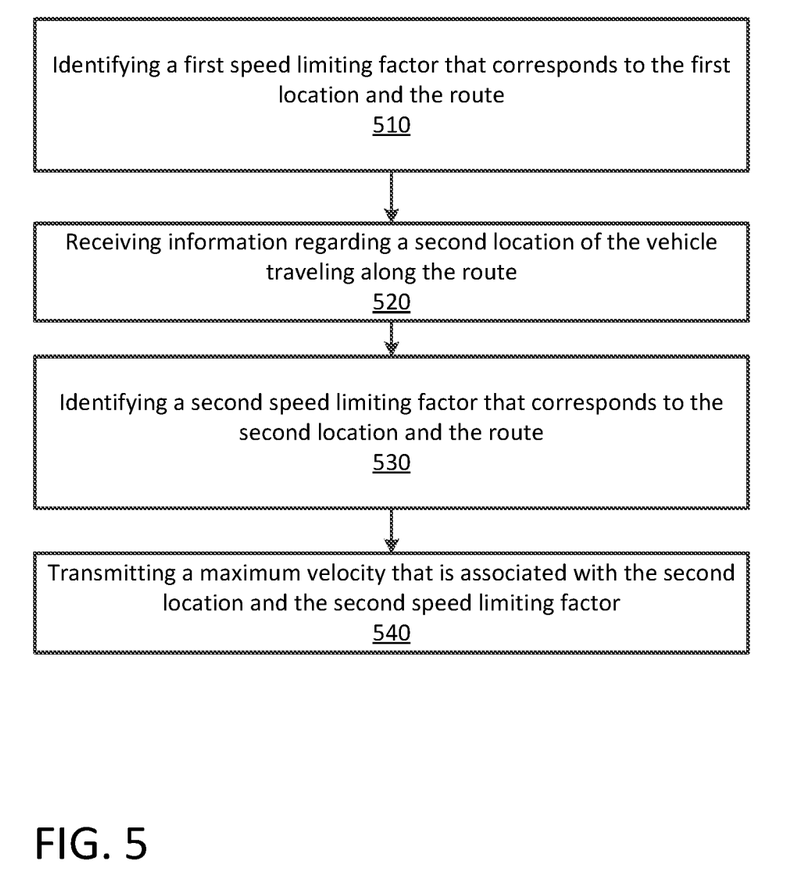
FIG. 5 illustrates a second exemplary method consistent with the present disclosure.

FIG. 5 illustrates a second exemplary method consistent with the present disclosure. FIG. 5 begins with a first step 510 where a first speed limiting factor is identified. This first speed limiting factor may be associated with a first location and with a route.

The speed limiting factor identified in step 510 may be a speed limit associated with the first location or may be a factor relating to a fact or a circumstance along the route that the vehicle is traveling. The first speed limiting factor may have been identified after an external computer that is associated with controlling the maximum speed of the vehicle has received a GPS location of the vehicle. Here again a control sub-system at the vehicle may have identified the vehicle's GPS location and transmitted that location to a server or to a speed data provider like the server 270 and speed data provider 280 of FIG. 2. Facts and circumstances identified in step 510 may relate to a vehicle type, the weight of the vehicle, the experience level of the driver of the vehicle, the time or day/night, or whether the Sun is shining in the eyes of the driver. Other facts that may be relevant to controlling the speed of a vehicle may relate to current weather conditions, the location of a service or emergency vehicle, the location of a beacon, or may relate to a particular type of zone (i.e. a construction zone, a school zone, or hospital zone) of travel.

After step 510, the method of FIG. 5 moves from step 510 to step 520 where information regarding a second location of the vehicle traveling along the route may be received. Step 520 may be a step where an external computing device receives a second GPS location of the vehicle as it travels down the roadway.

Next in step 530, a second speed limiting factor that corresponds to the second location along the route may be identified. Like the speed limiting factor of step 510, the speed limiting factor of step 530 may be associated with be a speed limit associated with a current location or may be a factor relating a fact or a circumstance that may affect the roadway. Here again facts or circumstances identified in step 530 may relate to a type of a vehicle, the weight of the vehicle, the experience level of a driver of the vehicle, the time or day/night, whether the Sun is shining in the eyes of the driver, facts relating to current weather conditions, the location of an service vehicle or an emergency vehicle, the location of a beacon, or may relate a particular type of zone (i.e. a construction zone, a school zone, or hospital zone) that the vehicle is approaching.

After step 530, step 540 may transmit a maximum speed that is associated with the second location and with the second speed limiting factor to the vehicle control system. Note that information transmitted in step 540 may include information transmitted to a vehicle as discussed in respect to steps 430, 450, or 460 of FIG. 4. As such, information transmitted to a vehicle (vehicle control sub-system) may relate to controlling the maximum speed of a vehicle based on various factors, characteristics, anomalies, or road conditions. Such factors, characteristics, anomalies, or road condition information may relate to a vehicle type, a vehicle weight, driver experience level, weather conditions, times of day/night, and may include information that causes the speed of a vehicle to change a maximum speed before the vehicle reaches a particular location.

Figure 6:
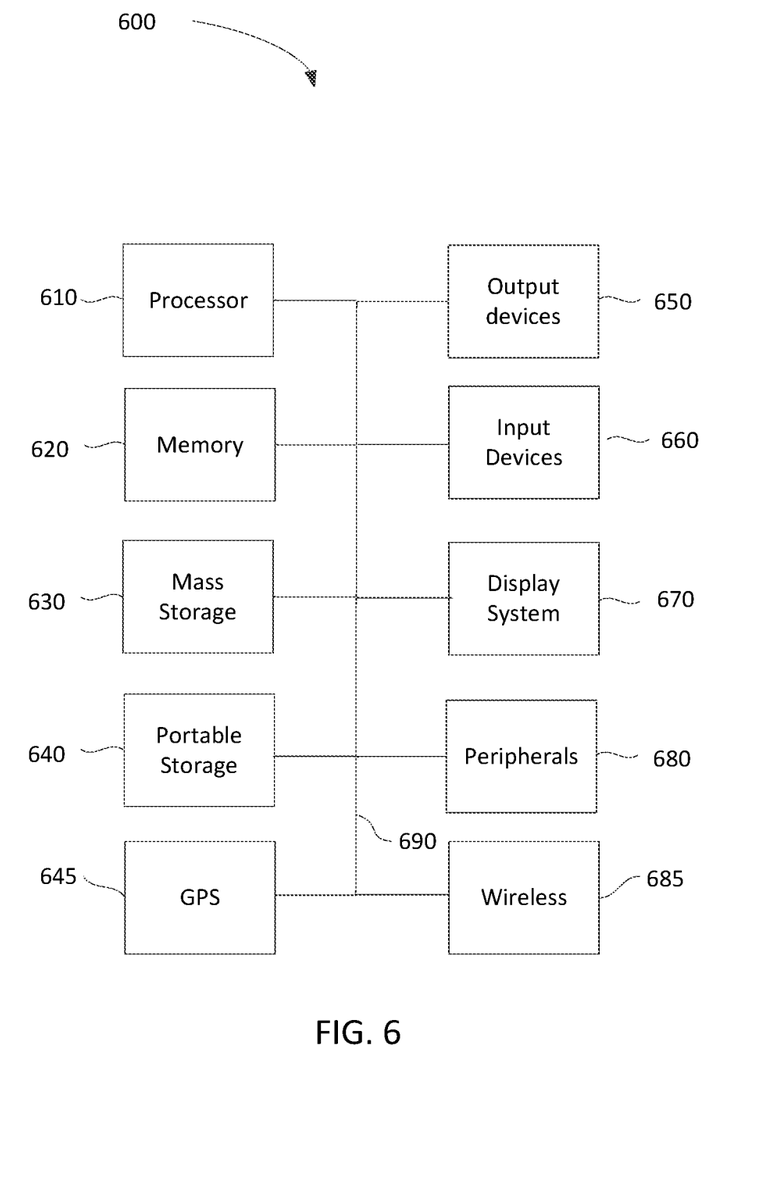
FIG. 6 illustrates an exemplary computing system that may be used to implement all or a portion of a device for use with the present technology.

FIG. 6 illustrates an exemplary computing system that may be used to implement all or a portion of a device for use with the present technology. The computing system 600 of FIG. 6 includes one or more processors 610 and memory 620. Main memory 620 stores, in part, instructions and data for execution by processor 610.

Main memory 620 can store the executable code when in operation. The system 600 of FIG. 6 further includes a mass storage device 630, portable storage medium drive(s) 640, a GPS system 645, output devices 650, user input devices 660, a graphics display 670, peripheral devices 680, and a wireless communication system 685. The components shown in FIG. 6 are depicted as being connected via a single bus 690. However, the components may be connected through one or more data transport means. For example, processor unit 610 and main memory 620 may be connected via a local microprocessor bus, and the mass storage device 630, peripheral device(s) 680, portable storage device 640, and display system 670 may be connected via one or more input/output (I/O) buses. Mass storage device 630, which may be implemented with a magnetic disk drive, solid state drives, an optical disk drive or other devices, may be a non-volatile storage device for storing data and instructions for use by processor unit 610. Mass storage device 630 can store the system software for implementing embodiments of the present invention for purposes of loading that software into main memory 620.

Portable storage device 640 operates in conjunction with a portable non-volatile storage medium, such as a FLASH thumb drive, compact disk or Digital video disc, to input and output data and code to and from the computer system 600 of FIG. 4. The system software for implementing embodiments of the present invention may be stored on such a portable medium and input to the computer system 600 via the portable storage device 640.

Input devices 660 provide a portion of a user interface. Input devices 660 may include an alpha-numeric keypad, such as a keyboard, for inputting alpha-numeric and other information, or a pointing device, such as a mouse, a trackball, stylus, or cursor direction keys. Additionally, the system 600 as shown in FIG. 6 includes output devices 650. Examples of suitable output devices include speakers, printers, network interfaces, and monitors.

Display system 670 may include a liquid crystal display (LCD) or other suitable display device. Display system 670 receives textual and graphical information, and processes the information for output to the display device.

Peripherals 680 may include any type of computer support device to add additional functionality to the computer system. For example, peripheral device(s) 680 may include a modem or a router.

GPS system 645 may include an antenna (not illustrated in FIG. 6) that receives global positioning information from one or more satellites such that a location associated with a current location of computer system 600 may be identified and provided to processor 610 via bus 690.

FIG. 6 also includes a wireless communication system 685 that may include an antenna (not illustrated in FIG. 6). Wireless communication system 685 may be configured to receive or transmit information via any standard wireless communication technology standard in the art. As such, wireless communication system 685 may receive or transmit information according to a wireless (2G, 3G, 4G, blue-tooth, 802.11, light strobes, or other) cellular or device to device standard, or may use radio or optical communication technologies. Wireless communication system may be configured to receive signals directly from pieces of infrastructure along a roadway (such as a signal light or roadway sensors), may be configured to receive signals associated with an emergency band, or may be configured to receive beacons that may be located at a service or emergency vehicle. Computer systems of the present disclosure may also include multiple wireless communication systems like communication system 685.

The components contained in the computer system 600 of FIG. 6 are those typically found in computer systems that may be suitable for use with embodiments of the present invention and are intended to represent a broad category of such computer components that are well known in the art. Thus, the computer system 600 of FIG. 6 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Android, and other suitable operating systems.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

The invention claimed is:

1. A method for controlling speed of a vehicle, the method comprising:
   receiving a first set of location data that are associated with a route and that were identified by a global positioning system (GPS) at the vehicle, the first set of location data corresponding a first position along the route, wherein the first set of location data is transmitted by an electronic device that is at the vehicle, and the first set of location data is received over a network interface;
   identifying a first maximum speed that corresponds to the route, a first speed limiting factor, and a characteristic that is associated with the vehicle;
   transmitting over the network interface a first message that includes the first maximum speed that corresponds to the route, the first speed limiting factor, and the characteristic that is associated with the vehicle, wherein the electronic device at the vehicle limits a first maximum velocity of the vehicle to the first maximum speed along the route;
   identifying a second maximum speed that corresponds to the route, a second speed limiting factor, the characteristic, and a second position along the route; and
   transmitting over the network interface a second message that includes the second maximum speed that corresponds to the route, the second speed limiting factor, the characteristic, and the second position, wherein the electronic device at the vehicle limits a second maximum velocity of the vehicle to the second maximum speed along the route at a position that corresponds to the second position along the route.

2. The method of claim 1, wherein the first speed limiting factor and the second speed limiting factor correspond to one or more speed limits of a roadway that is associated with the route.

3. The method of claim 1, wherein the second maximum speed corresponds to a speed that is lower than a speed limit of a roadway that is associated with the route.

4. The method of claim 1, wherein the position that corresponds to the second position is traversed by the vehicle before the vehicle reaches the second position.

5. The method of claim 1, wherein the electronic device reduces a current maximum speed of the vehicle to the second maximum speed before the vehicle reaches the second position.

6. The method of claim 5, wherein the reduction of the current maximum speed of the vehicle to the second maximum speed is based on the characteristic.

7. The method of claim 1, wherein the characteristic is associated with at least one of a type of vehicle or a driver of the vehicle.

8. The method of claim 1, wherein a third message is transmitted over the network interface that includes a plurality of different locations along the route and a plurality of different speed limiting factors along the route, and the electronic device at the vehicle limits one or more maximum speeds of the vehicle as the vehicle travels past each of the plurality of different locations included in the third message according to the plurality of different speed limiting factor along the route.

9. The method of claim 1, further comprising receiving one or more additional sets of location data that are associated with the rout and that were identified by the GPS system at the electronic device.

10. The method of claim 1, further comprising:
receiving position information from a plurality of additional vehicles traveling along the route;
identifying actual speeds of the plurality of additional vehicles as they travel along the route;
identifying that two or more of the plurality of additional vehicles traveling along the route traveled at a speeds below at least one threshold speed at at least at one point along the route;
identifying that the at least one point along the route can be associated with an unanticipated hazard based on the two or more of the plurality of additional vehicles traveling below the at least one threshold speed; and
transmitting information associated with the unanticipated hazard, wherein the electronic device at the vehicle limits the maximum speed of the vehicle in the vicinity of the at least one point along the route based on the unanticipated hazard.

11. A non-transitory computer readable storage medium having embodied thereon a program executable by a processor for performing a method for controlling speed of a vehicle, the method comprising:
receiving a first set of location data that are associated with a route and that were identified by a global positioning system (GPS) at the vehicle, the first set of location data corresponding a first position along the route, wherein the first set of location data is transmitted by an electronic device that is at the vehicle, and the first set of location data is received over a network interface;
identifying a first maximum speed that corresponds to the route, a first speed limiting factor, and a characteristic that is associated with the vehicle;
transmitting over the network interface a first message that includes the first maximum speed that corresponds to the route, the first speed limiting factor, and the characteristic that is associated with the vehicle, wherein the electronic device at the vehicle limits a first maximum velocity of the vehicle to the first maximum speed along the route;
identifying a second maximum speed that corresponds to the route, a second speed limiting factor, the characteristic, and a second position along the route; and
transmitting over the network interface a second message that includes the second maximum speed that corresponds to the route, the second speed limiting factor, the characteristic, and the second position, wherein the electronic device at the vehicle limits a second maximum velocity of the vehicle to the second maximum speed along the route at a position that corresponds to the second position along the route.

12. The non-transitory computer readable storage medium of claim 11, wherein the first speed limiting factor and the second speed limiting factor correspond to one or more speed limits of a roadway that is associated with the route.

13. The non-transitory computer readable storage medium of claim 11, wherein the second maximum speed corresponds to a speed that is lower than a speed limit of a roadway that is associated with the route.

14. The non-transitory computer readable storage medium of claim 11, wherein the position that corresponds to the second position is traversed by the vehicle before the vehicle reaches the second position.

15. The non-transitory computer readable storage medium of claim 11, wherein the electronic device reduces a current maximum speed of the vehicle to the second maximum speed before the vehicle reaches the second position.

16. The non-transitory computer readable storage medium of claim 15, wherein the reduction of the current maximum speed of the vehicle to the second maximum speed is based on the characteristic.

17. The non-transitory computer readable storage medium of claim 11, wherein the characteristic is associated with at least one of a type of vehicle or a driver of the vehicle.

18. The non-transitory computer readable storage medium of claim 11, wherein a third message is transmitted over the network interface that includes a plurality of different locations along the route and a plurality of different speed limiting factors along the route, and the electronic device at the vehicle limits one or more maximum speeds of the vehicle as the vehicle travels past each of the plurality of different locations included in the third message according to the plurality of different speed limiting factor along the route.

19. The non-transitory computer readable storage medium of claim 11, the program further executable to:
receive position information from a plurality of additional vehicles traveling along the route;
identify actual speeds of the plurality of additional vehicles as they travel along the route;
identify that two or more of the plurality of additional vehicles traveling along the route traveled at a speeds below at least one threshold speed at at least at one point along the route;
identify that the at least one point along the route can be associated with an unanticipated hazard based on the two or more of the plurality of additional vehicles traveling below the at least one threshold speed; and
transmit information associated with the unanticipated hazard, wherein the electronic device at the vehicle limits the maximum speed of the vehicle in the vicinity of the at least one point along the route based on the unanticipated hazard.

20. An apparatus for controlling velocity of a vehicle, the apparatus comprising:
a memory;
a processor; and
a network interface that receives a first set of location data that are associated with a route and that were identified by a global positioning system (GPS) at the vehicle, the first set of location data corresponding a first position along the route, wherein:
the first set of location data is transmitted by an electronic device that is at the vehicle,
the processor executing instructions out of the memory identifies a first maximum speed that corresponds to the route, a first speed limiting factor, and a characteristic that is associated with the vehicle,
a first message that includes the first maximum speed that corresponds to the route, the first speed limiting factor, and the characteristic that is associated with the vehicle are transmitted over the network interface,
the electronic device at the vehicle limits a first maximum velocity of the vehicle to the first maximum speed along the route,
the processor executing instructions out of the memory identifies a second maximum speed that corresponds to the route, a second speed limiting factor, the characteristic, and a second position along the route, and a second message that includes the second maximum speed that corresponds to the route, the second speed limiting factor, the characteristic, and the second position is transmitted over the network interface, and the electronic device at the vehicle limits a second maximum velocity of the vehicle to the second maximum speed along the route at a position that corresponds to the second position along the route.

* * * * *